March 21, 1967 G. B. COTTRELL 3,310,758
TERNARY PULSE WIDTH GENERATION
Filed June 24, 1964 3 Sheets-Sheet 1

INVENTOR.
GEORGE B. COTTRELL
BY
ATTORNEY

March 21, 1967 — G. B. COTTRELL — 3,310,758
TERNARY PULSE WIDTH GENERATION
Filed June 24, 1964 — 3 Sheets-Sheet 3

INVENTOR.
GEORGE B. COTTRELL
BY
ATTORNEY

United States Patent Office 3,310,758
Patented Mar. 21, 1967

3,310,758
TERNARY PULSE WIDTH GENERATION
George B. Cottrell, Dairy Valley, Calif., assignor to North American Aviation, Inc.
Filed June 24, 1964, Ser. No. 377,616
4 Claims. (Cl. 332—9)

The present invention relates to a transmission system or amplifier for transmitting information and more particularly to a pulse width modulating system.

Pulse width modulators are frequently employed to transmit information from analog signals such as control signals. Pulse width modulation generally is either binary or ternary in nature. Binary operation causes high zero signal currents in a resistive load; currents at the pulse repetition frequency can be minimized by the inclusion of sufficient inductance in the load. Pulse repetition frequency depends therefore on the inductance of the load. Desirable frequencies are 5 kc.–10 kc., however, the use of such frequencies causes heating in motor armatures due to core losses. A three-state or ternary system allows the uhe of very low inductance loads because zero signal currents are low regardless of frequency. Therefore, the frequency can be lowered making core loss less significant and gives rise to the possibility of using the pulse rate as a mechanical dither.

Conventional ternary pulse width is generally produced through the superimposing of an error signal upon a triangular wave form operating in a symmetrical dead zone of some active device. Accordingly, the output is subject to asymmetrical bias and base-emitter diode conduction levels. In extreme cases a resultant dead zone of operation may result or a quasibinary state may prevail causing high zero signal currents or motor heating due to core loses. Also, the asymmetry of the input may result in D.C. offsets in the output. Binary pulse width generation is also subject to these problems but to a significantly-smaller degree. If a ternary system could be produced using binary techniques, the advantages of both would result but the disadvantages would be virtually eliminated.

Therefore, the object of the invention is to provide a ternary pulse width modulator which has a minimum output during a no-signal condition.

Still another object of the invention is the provision of a ternary pulse width modulator in which there can be no "dead zone" under normal operating conditions.

A further object of the invention is to provide a pulse width modulator wherein the null point during no-signal conditions has a minimum variations due to external conditions such as humidity, etc.

Still another object of the invention is the provision of a pulse width modulator which can be easily adjusted to prevent a "dead zone" yet has a minimum output during no-signal conditions.

A feature of the present invention includes a pulse width modulator including a first channel that produces a plurality of pulses and second channel that produces a plurality of other pulses having the same time width and time domain as said pulses. A control signal of a predetermined polarity increases the tiem width of said pulses while decreasing the time width of said other pulses. The said other pulses are then substracted from said pulses to produce a signal which is a function of the time width of these pulses.

These and other objects of the present invention will be apparent from the following description of the accompanying drawings which illustrate certain preferred embodiments thereof and wherein.

Figure 1:
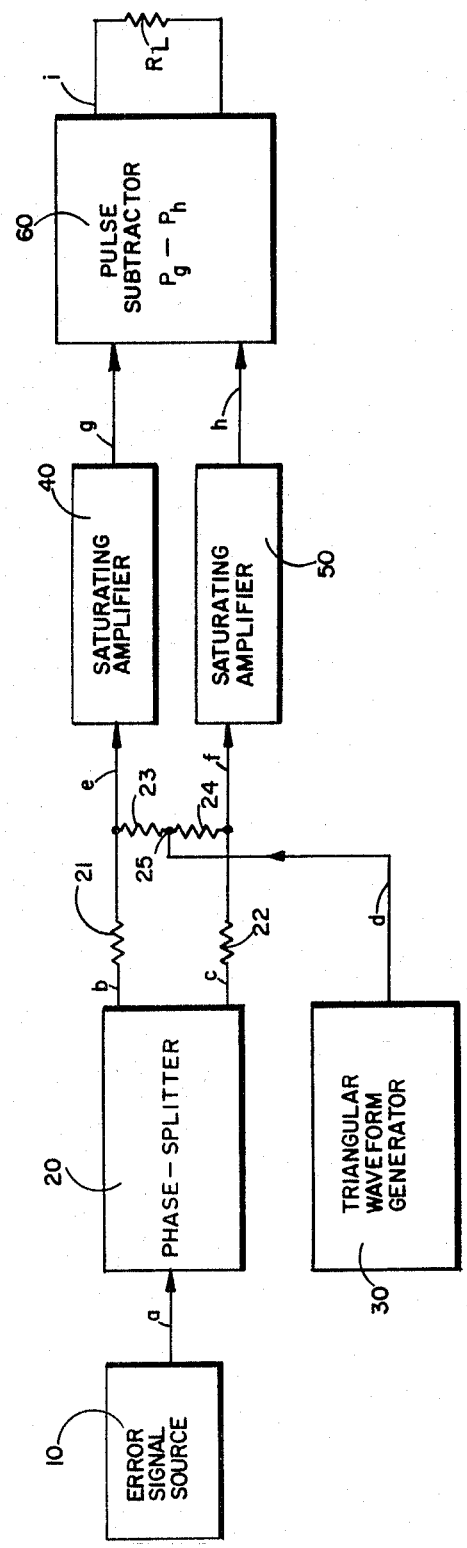
FIG. 1 illustrates a schematic diagram in block form of the embodiment of the invention.
Figure 2:
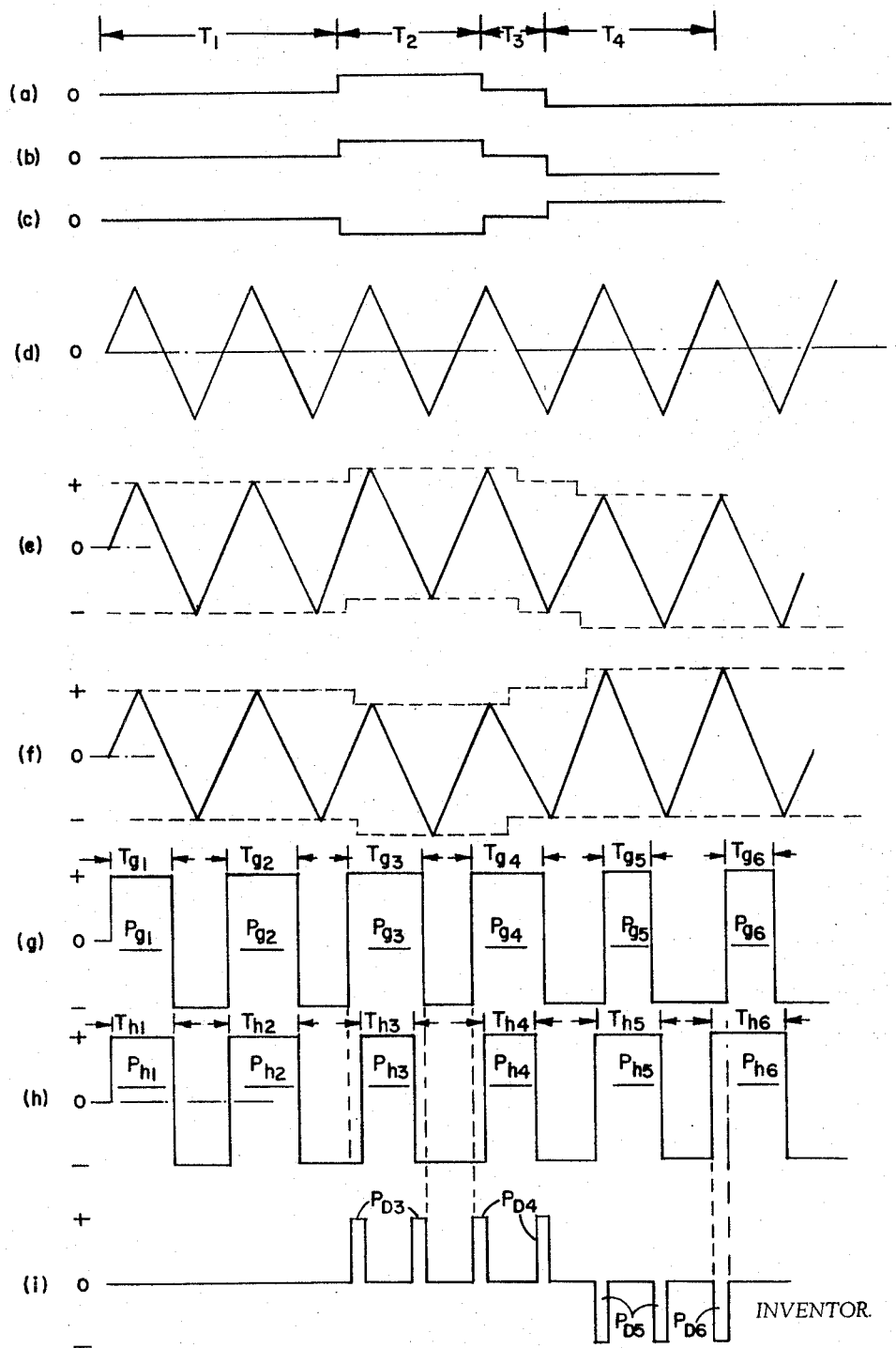
FIG. 2 illustrates waveforms occurring at various points of the embodiment illsutrated in FIG. 1.

The embodiment of the invention illustrated in FIG. 1 comprises a source of error or control signals 10 having an output at $a$. Such signals are illustrated in FIG. 2($a$). The waveforms occurring at points $a$ through $i$ in FIG. 1 are shown in FIG. 2 by the corresponding letter. That is, the waveform occurring at $a$, shown in FIG. 1, is illustrated in FIG. 2($a$). Whereas the waveform occurring at $b$ in FIG. 1 is illustrated in FIG. 2($b$), etc.

The control signal shown in FIG. 2($a$) has been divided into four time periods by way of example, designated as time periods $T_1$, $T_2$, $T_3$ and $T_4$. Time periods $T_1$ and $T_3$, as shown in FIG. 2($a$), are periods of no-signal whereas time periods $T_2$ is a period of positive going control signal from the source 10 whereas time period $T_4$ is a time period having negative control signal emanating from source 10. The control signal from source 10 is applied to a phase-splitter 20 which performs the function of providing two outputs. One output at point $c$ is 180° out of phase with the control signal at $a$ as illustrated in FIG. 2($c$). The other output at point $b$ is illustrated in FIG. 2($b$) and is in phase with the input to phase-splitter 20. The waveform at $b$ is applied across a dropping resistor 21 and then across a voltage divider illustrated as including resistors 23 and 24 whereas the waveform at $c$ is applied across a dropping resistor 22 and then across the voltage divider in an opposite sense.

A triangular waveform generator 30 produces a voltage waveform output at $d$ and shown in FIG. 2($d$). This is applied to a common reference point 25 between resistors 23 and 24. The waveform at $d$ is added to or modulated by the waveform at $b$ to produce a waveform at $e$ shown in FIG. 2($e$) which is applied to a saturating amplifier 40 in a first channel. The signal at $d$ is added with the waveform at $c$ to produce a voltage waveform at $f$ shown in FIG. 2($f$) which is applied to a saturating amplifier 50 in a second chanel. As seen in FIG. 2($e$), during time periods $T_1$ and $T_3$, the voltage waveform at $e$ is the same as the waveform at $d$. During time period $T_2$, a positive D.C. component is present in the waveform at $e$. During time period $T_4$, the signal at $e$ has a negative D.C. component. Therefore, the time width of the positive going portions at hte output of the saturating amplifier 40 increases during time period $T_2$ and decreases during time period $T_4$ as shown in FIG. 2($g$). The converse is true when the signal at $c$ is added to the signal at $d$ to produce the waveform at $f$ as shown in FIG. 2($f$). That is, during time periods $T_1$ and $T_3$, the triangular waveform at $f$ has no D.C. component since these are no-signal periods. However, during time period $T_2$, the waveform at $f$ has a negative D.C. component so that the time width of the positive going pulses from saturating amplifier 50, shown in FIG. 2($h$), is decreased. During time period $T_4$ on the other hand, adding waveform at $c$ to waveform $d$ results in a positive D.C. component so as to increase the time width of the positive going pulses at hte output of saturating amplifier 50.

More specifically, as viewing FIGS. 2($g$), ($h$) and ($i$), positive going portions of the waveform at $g$, that is, pulses $P_{g1}$ and $P_{g2}$ are equal in time width and amplitude with the corresponding positive going pulses $P_{h1}$ and $P_{h2}$. However, during time period $T_2$, the positive pulses in signal $g$, $P_{g3}$ and $P_{g4}$, increase in time width. However, during time period $T_2$, the positive going pulses in the waveform at $h$ decrease in time width as illustrated by pulses $P_{h3}$ and $P_{h4}$.

The signals at $g$ and $h$ are applied to a pulse subtractor 60 which subtracts the positive going portions or pulses of the waveform at $h$ from the corresponding positive going pulses of the waveform at $g$. The details of this subtractor will be described later. Due to this subtraction, there is no output from the subtractor 60 during time period $T_1$ as shown in FIG. 2($i$). However, during time period $T_2$, the positive going current pulse $P_{h3}$ is subtracted from the current pulse $P_{g3}$ and the positive going pulse $P_{h4}$ is subtracted from the positive going pulse $P_{g4}$ to thereby provide an output signal which corresponds to the time width and time amplitude area difference of these pulses. As shown in FIG. 2($i$), the output pulses $P_{D3}$ are an indication of the area and time width difference of the positive going pulses $P_{g3}$ and $P_{h3}$; likewise, the two pulses $P_{d4}$ are a function of the area and/or time width difference of pulse $P_{g4}$ minus pulse $P_{h4}$. Since the pulse $P_{h5}$ has a greater area and time width than pulse $P_{g5}$, the resulting output pulses from subtractor 60 are negative going. Hence, the two pulses $P_{D5}$ represent the area and time width difference between $P_{h5}$ and $P_{g5}$. Negative going pulses $P_{D6}$ (only one shown) represent the area difference between pulses $P_{h6}$ and $P_{g6}$.

Figure 3:
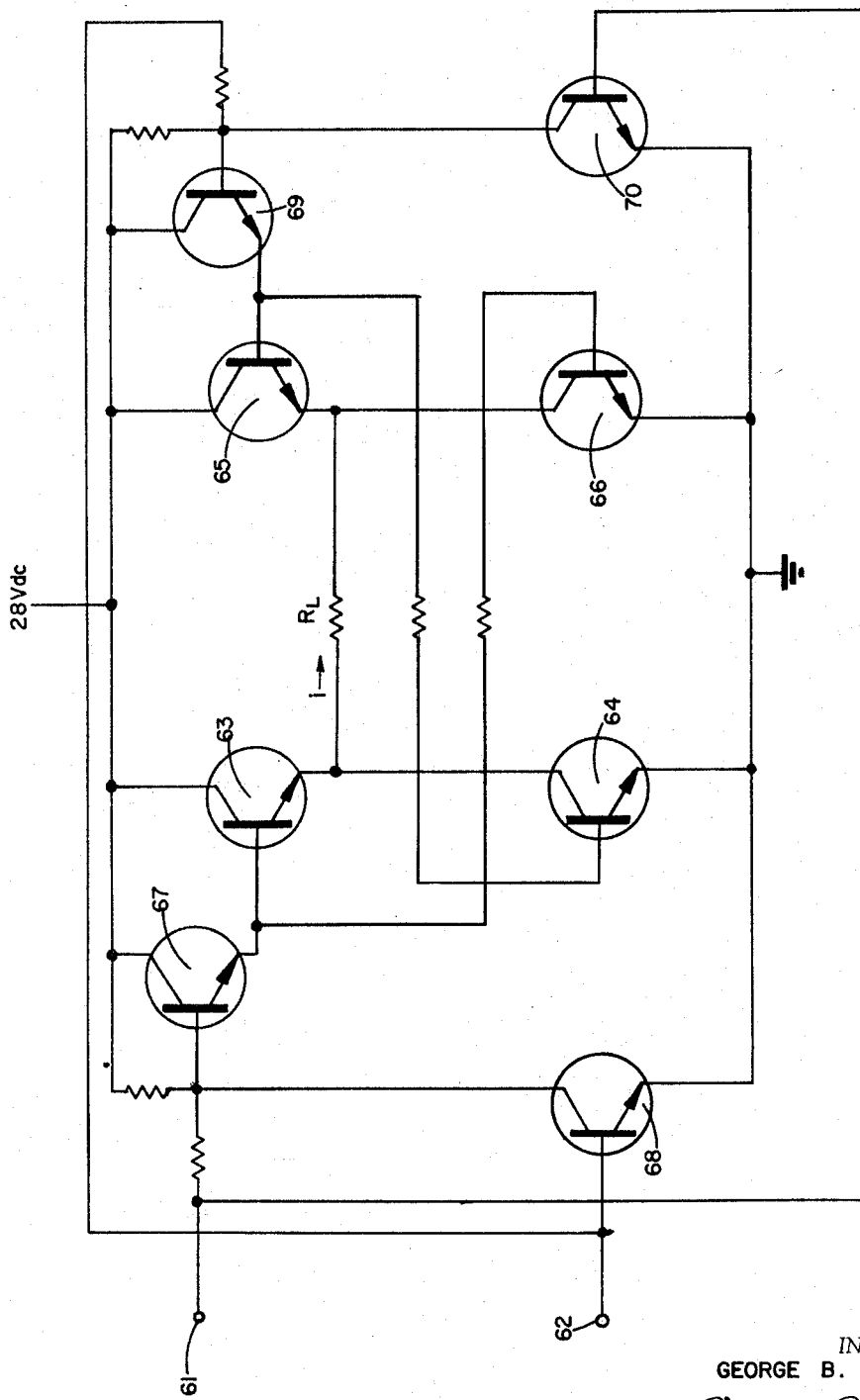
FIG. 3 is a schematic diagram of the pulse area subtractor illustrated in FIG. 1.

FIG. 3 illustrates one circuit for providing the pulse time width subtraction described above, performed by subtractor 60. The waveform $g$ is applied to input terminal 61 whereas the waveform $h$ is applied to input terminal 62. When both waveforms $g$ and $h$ are positive, the transistor 68 will conduct and ground the base of transistor 67. This will prevent transistor 67 from conducting. With transistor 68 connecting the base of transistor 67 to ground, the positive going signal on 61 is thereby grounded to prevent conduction of transistor 67. The positive pulse at 62 is applied to the base of transistor 69; however, the positive pulse at 61 is also applied to the base of transistor 70 to render it conductive. Thus, 70 grounds the base of transistor 69 to thereby prevent conduction of 69. Since transistor 69 is not conducting, transistors 64 and 65 will not conduct. Likewise, since transistor 67 is not conducting, transistors 63 and 66 will not conduct. For this reason, with pulses at $g$ and $h$ both positive, there will be no current through the load resistor $R_L$.

The second condition would be when $g$ and $h$ are both negative. Under this condition, the subtractor 60 will not provide output current through resistor $R_L$. When both $g$ and $h$ are negative, a negative signal will be applied to the base of transistors 67, 68, 69 and 70. Consequently, none of these transistors will conduct. It is for this reason that transistors 63, 64, 65 and 66 will also not conduct. Consequently under this condition, there will be no current through the load resistor $R_L$.

The third condition is when $g$ is positive and $h$ is negative. Under this condition, the base of transistor 68 will be negative and hence transistor 68 will not conduct. In addition, transistor 69 will not conduct since the negative potential from $h$ is also applied to the base of transistor 69. Since transistor 69 does not conduct, transistors 65 and 64 will not conduct. With $g$ positive, it will render transistor 67 conductive. As a result of transistor 67 conducting, transistor 63 and transistor 66 will conduct. Since the negative potential of $h$ is applied to the base of 69, it will prevent collector bias from being applied to transistor 70. Hence, transistor 70 will not conduct. Since transistors 63 and 66 are rendered conductive by transistor 67, there will be a current flow from the D.C. source through the collector and emitter junctions of transistors 63 and 66 and load resistor $R_L$ in a first direction as shown in FIG. 3. For algebraic purposes, we will assume that this is in a positive direction so as to provide positive current and produce the pulses $P_{D3}$ and $P_{D4}$ illustrated in FIG. 2($i$).

The fourth condition is when the signal at $g$ is negative and the signal at $h$ is positive. With these conditions, the negative potential of $g$ will prevent conduction of transistor 67 and thereby prevent conduction of transistors 63 and 66. The negative potential of $g$ also prevents conduction of transistor 70. However, the positive potential on the base of transistor 69 will render transistor 69 conductive. Transistor 68 will not conduct due to the negative potential of $g$ on the base of 67 preventing collector bias on transistor 68. Transistor 69 conducting renders transistors 65 and 64 conductive. Current will flow in an opposite direction through the emitter collector junction of transistor 65, the load resistor $R_L$ and the collector emitter junctions of transistor 64. This current flow will be in the opposite direction as the current flow described in the above third condition. The current produces pulses $P_{D5}$ and $P_{D6}$ as shown in FIG. 2($i$).

The pulse width modulator of the present invention is particularly suitable for driving control or servo motors at a desired speed and direction. The speed will be a function of the output current pulses provided at the output of 60. The direction of rotation of the motor will be dependent upon the polarity of these pulses, illustrated in FIG. 2($i$).

In prior ternary pulse width modulators, the error or control signal modulated a single triangular waveform signal. This modulated signal was then passed through a limiter clipper circuit. The negative and positive amplitude thresholds of such a circuit must be set to be equal to or less than the positive and negative peak amplitudes of the unmodulated triangular waveform signal to avoid a "dead zone" (an input signal but no output signal). If the clipper limiter threshold levels are less than the unmodulated peak amplitudes, there will be a current through the load such as a servo motor during no signal conditions. This of course results in unnecessary heat rise and power loss. Thus, in such prior pulse width modulators, the matching of the clipper limiter thresholds to the triangular waveform peaks is very critical. Consequently, it was necessary to either have a "dead zone" or output current during no signal conditions.

In the present invention, however, no thresholds are employed and consequently the matching of the thresholds to the peaks of a signal is avoided. Since the output is basically a function of the time width difference of two pulses, the device of the present invention will not have a "dead zone."

The pulses compared are from two channels and it is relatively easy to synchronize the time domain (leading and trailing edges) of these pulses so as to have no output during no-signal conditions. In the embodiment illustrated herein, there is a single source of triangular waveform signals for both channels. Consequently, synchronizing the pulses of both channels is precise to thereby avoid current in the load during no-signal conditions. Even with a change of other factors such as temperature, humidity, etc., the pulses will be synchronized.

Although the device of this invention has been described particularly in connection with the above description and the accompanying drawings, it is not intended that the invention should be limited thereby but only in accordance and scope of the following claims, in which

I claim:

1. A pulse width modulator comprising a source of control signal, means responsive to said control signal for providing a plurality of first pulses, means responsive to said control signal for providing a plurality of second pulses with each of said second pulses normally having substantially the same time width and time domain as a corresponding one of said first pulses, said source of control signal being operative to increase the time width of said first pulses as the amplitude of said control signal increases and being operative to decrease the time width of said second pulses as the amplitude of said control signal increases, and means responsive to said plurality of first pulses and said plurality of second pulses for producing an output signal which is representative of the difference of the time width of said first pulses and said second pulses.

2. A pulse width modulator for transmitting an error signal comprising a source of control signal, means responsive to said control signal for providing a plurality of first pulses, means responsive to said control signal for providing a plurality of concurrent second pulses, the time width of said second pulses and said first pulses normally being substantially equal, said cource of control signal being operative to change the time width of first pulses in response to said control signal differing from a predetermined reference level, said source of control signal being operative to simultaneously change, in an opposite sense, the time width of each of said second pulses in response to said control signal differing from said reference level, and means responsive to said plurality of first pulses and said plurality of second pulses for producing an output signal which is a function of the difference of the time width of each said first pulses and the corresponding concurrent said second pulse.

3. A pulse width modulator comprising a source of control signal, means responsive to said control signal for providing a plurality of first pulses, means responsive to said control signal for providing a plurality of second pulses with each of said second pulses having leading and trailing edges concurrent with the leading and trailing edges of a corresponding one of said first pulses, said source of control signal being operative to change the time width of said first pulses when the amplitude of said control signal differs from a predetermined reference level, said source of control signal being operative to simultaneously change, in an opposite sense, the time width of said second pulses when the amplitude of said control signal differs from said predetermined reference level and means responsive to said plurality of first pulses and said plurality of second pulses for producing an output signal which is representative of the difference of the time width of said first and second pulses.

4. A pulse width modulator comprising a source of control signal, means responsive to said control signal for providing a plurality of first pulses, means responsive to said control signal for providing a plurality of second pulses with each of said second pulses normally having substantially the same time width and time domain as a corresponding one of said first pulses, said source of control signals being operative to increase the time width of said first pulses as a function of the amplitude of said control signal changing in a first sense and being operative to decrease the time width of said first pulses as a function of the amplitude of said control signal changing in a second sense, said source of control signal being operative to simultaneously decrease the time width of said second pulses as a function of the amplitude of said control signal changing in said first sense and being operative to increase the time width of said second pulses as a function of the amplitude of said control signal changing in said opposite sense, and means responsive to said plurality of first pulses and said plurality of second pulses for producing an output signal that varies as a function of the time width of each of said first pulses less the time width of the said corresponding one of said second pulses.

References Cited by the Examiner

UNITED STATES PATENTS

| | | | |
|---|---|---|---|
| 2,677,760 | 5/1954 | Bess | 328—112 |
| 3,258,669 | 6/1966 | Krassoievitch | 318—341 X |
| 3,260,912 | 7/1966 | Gregory | 329—106 X |

ROY LAKE, *Primary Examiner.*

A. L. BRODY, *Assistant Examiner.*